UNITED STATES PATENT OFFICE.

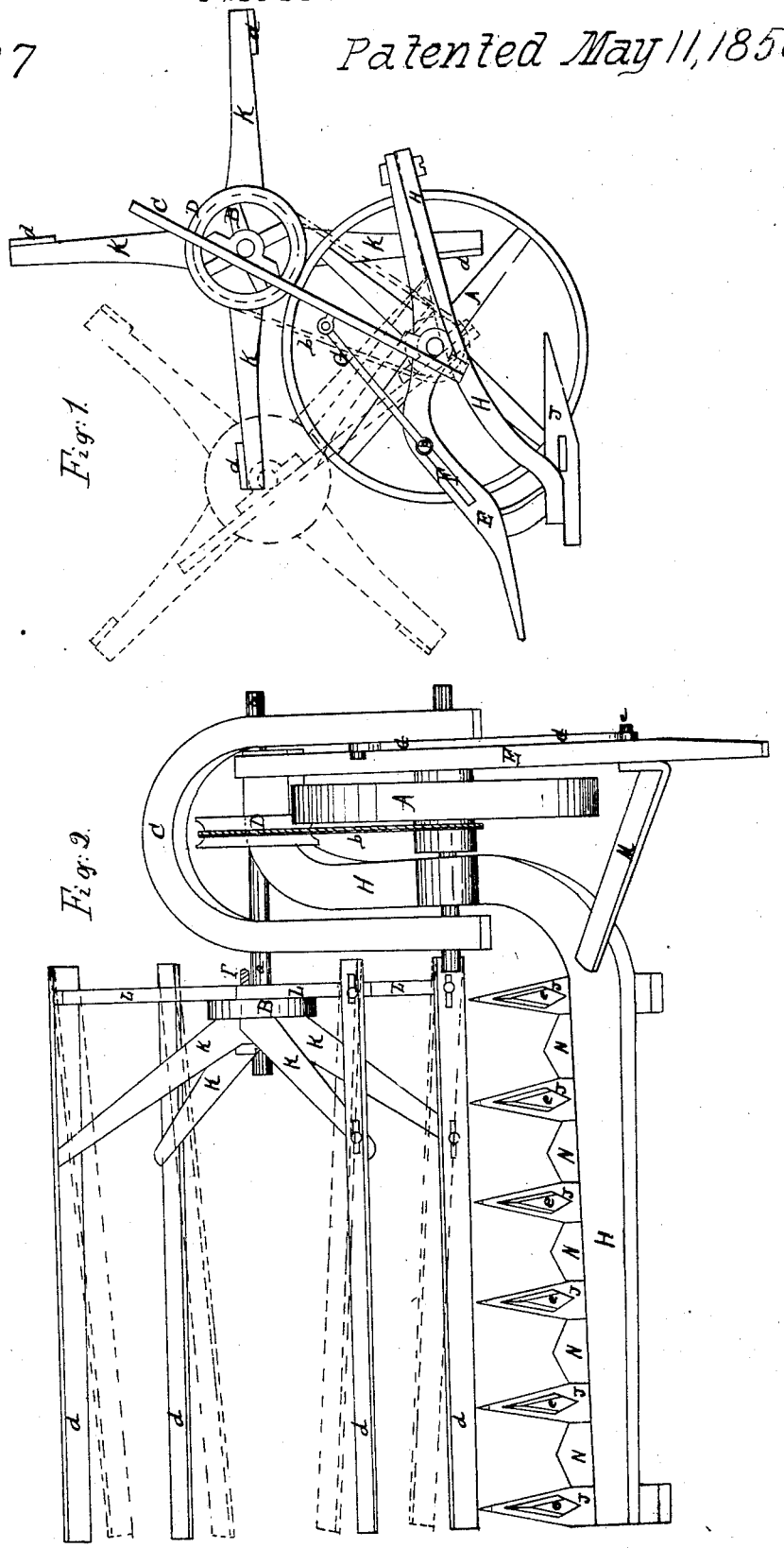

JNO. S. TROXEL, OF MOUNT PLEASANT, PENNSYLVANIA.

IMPROVEMENT IN HARVESTERS.

Specification forming part of Letters Patent No. 20,227, dated May 11, 1858.

*To all whom it may concern:*

Be it known that I, JOHN S. TROXEL, of Mount Pleasant, Westmoreland county, and State of Pennsylvania, have invented certain new and useful Improvements in Reels for Harvesters; and I do hereby declare that the following is a full and exact description thereof, reference being had to the accompanying drawings, and to the letters of reference marked thereon.

Figure 1 is a side view. Fig 2 is a view in parallel perspective.

To enable others skilled in the art to make and use my invention, I will describe its construction and operation.

In Fig. 1, A is the driving-wheel; B, the circular metallic plate between the stationary and movable arms of the reel, having slots in it through which the bolt passes and into which the stationary arms are let, making them firmly attached together with the plate; C, the swinging or revolving yoke-lever with the bearings of the reel-shaft on each side of it, and on which the reel is hung, and which is attached by means of bearings to the main shaft of driving-wheel; D, the pulley on reel-shaft; b, strap connecting with driving-wheel and pulley for operating the reel; E, slotted lever with its fulcrum near the center and operating on main shaft; c, bolt with screw-nut passing through and working in the slot F in lever E; G, connecting-rod connecting lever E and swing revolving yoke C; H, the end of continuous cutter-bar, which is all of one piece; I, the finger. The change in the position of the reel is shown in red lines.

In Fig. 2, A is the driving-wheel; B, the circular metallic plate; C, the swinging and revolving yoke; D, the pulley-wheel on reel-shaft; a, reel-shaft; b, pulley-strap connecting pulley-wheel and main wheel, and which gives motion to the reel; K, the arms of the reel, which are stationary; d, the blades of the reel. The red lines show the blades changed in their relation to the cutter. E, slotted lever; c, bolt passing through slotted lever; G, connecting-rod between yoke-lever C and E.

In the operation of my invention, my reel, by means of the revolving yoke-lever C, being hung on main shaft, I dispense with any reel-post at the outer end of the reel-yoke. Lever C is adjustable by means of slot F in lever E and connecting-rod G and bolt c. If I wish to raise or lower my reel, I do so by unscrewing bolt c, then raise or lower yoke-lever C until I get it to the position I require, where it is firmly held by screw-bolt c. By this means I raise or lower the reel as I desire. The pulley-strap is thus always kept tight.

When I wish to change the line of the blades, either to make them parallel to the edge of the cutters or diverging therefrom, I do so by means of the movable rear arms of the reel and the bolt T passing through both sets of arms and the metallic plate. One arm is stationary and the other movable or partially revoluble. When this bolt T is unscrewed it will allow the movable arms to revolve, which will change the direction of the blades out of parallel with the cutters by means of the slots in said blades where they are attached to the arms, and the bolt T sliding in the slot in metallic plate firmly holds the arms in this position when the nut on it is tightened. This is an important arrangement in reels for operating in fallen or tangled grain, since it enables the operator to easily turn it onto the cutters.

Having thus described my invention, what I claim as new, and desire to secure by Letters Patent, is—

Hanging and operating reels for harvesters on the main shaft by means of yoke-lever C and slotted lever E, rod G, and movable arms L, slotted blades d, pulley and strap b, and slotted plate B, with screw-bolt T, as herein set forth and described.

JOHN S. TROXEL.

Witnesses:
 T. G. CLAYTON,
 JOS. C. CLAYTON.